(12) United States Patent
Kuri et al.

(10) Patent No.: US 7,733,977 B2
(45) Date of Patent: Jun. 8, 2010

(54) RADIO TRANSMISSION DEVICE AND RADIO TRANSMISSION METHOD

(75) Inventors: Kenichi Kuri, Kanagawa (JP); Akihiko Nishio, Kanagawa (JP); Masaru Fukuoka, Ishikawa (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 12/092,542

(22) PCT Filed: Nov. 9, 2006

(86) PCT No.: PCT/JP2006/322393

§ 371 (c)(1),
(2), (4) Date: May 2, 2008

(87) PCT Pub. No.: WO2007/055292

PCT Pub. Date: May 18, 2007

(65) Prior Publication Data

US 2009/0238123 A1    Sep. 24, 2009

(30) Foreign Application Priority Data

Nov. 10, 2005    (JP)    ............................. 2005-326730

(51) Int. Cl.
  *H04L 27/00*  (2006.01)
  *H04L 23/00*  (2006.01)
  *H04W 4/00*   (2009.01)
  *H04W 72/10*  (2009.01)

(52) U.S. Cl. ........................ 375/295; 375/377; 370/330; 455/452.2

(58) Field of Classification Search ................. 375/295, 375/377, 260, 358; 370/210, 208, 329, 330; 455/450, 451, 452.1, 452.2
See application file for complete search history.

(56) References Cited

U.S. PATENT DOCUMENTS

| | | | |
|---|---|---|---|
| 2008/0186880 A1* | 8/2008 | Seki et al. | 370/281 |
| 2009/0149180 A1* | 6/2009 | Kitazoe | 455/436 |
| 2009/0196249 A1* | 8/2009 | Kawamura et al. | 370/330 |
| 2009/0220017 A1* | 9/2009 | Kawamura et al. | 375/260 |
| 2009/0262699 A1* | 10/2009 | Wengerter et al. | 370/330 |
| 2010/0023830 A1* | 1/2010 | Wengerter et al. | 714/748 |

FOREIGN PATENT DOCUMENTS

| | | |
|---|---|---|
| JP | 2002-261772 | 9/2002 |
| JP | 2005-117579 | 4/2005 |
| JP | 2006-270279 | 10/2006 |

OTHER PUBLICATIONS

International Search Report dated Feb. 27, 2007.
3GPP TSG-RAN WG1, R1-050590, "Physical Channels and Multiplexing in Evolved UTRA downlink," NTT DoCoMo, Jun. 2005, p. 2, line 23.

* cited by examiner

*Primary Examiner*—Tesfaldet Bocure
(74) *Attorney, Agent, or Firm*—Dickinson Wright PLLC

(57) ABSTRACT

Disclosed are a radio transmission device and a radio transmission method capable of containing a plenty of mobile stations for receiving low-rate data and avoiding lowering a system throughput. A group ID assigning unit (108) groups UE receiving low-rate data and assigns a frequency by using the group ID. An SCCH processing unit (109) generates an SCCH containing the group ID. A low-rate control information processing unit (113) generates low-rate control information indicating a timing slot to which a low-rate UE has been assigned. A multiplexing unit (117) multiplies low-rate control information on RB to which low-rate data is assigned when multiplexing a pilot channel, SCCH, and data.

8 Claims, 15 Drawing Sheets

| MODULATION LEVEL | ALLOCATED RESOURCE AMOUNT | TYPE OF UE |
|---|---|---|
| MODULATION LEVEL ≦ QPSK | ALLOCATED RESOURCE AMOUNT ≦ 1RB | LOW RATE UE |
| MODULATION LEVEL ≦ QPSK | ALLOCATED RESOURCE AMOUNT > 1RB | HIGH RATE UE |
| MODULATION LEVEL > QPSK | ALLOCATED RESOURCE AMOUNT ≦ 1RB | HIGH RATE UE |
| MODULATION LEVEL > QPSK | ALLOCATED RESOURCE AMOUNT > 1RB | HIGH RATE UE |

FIG.2

| CODING RATE COMMON TO ALL RB'S | RB-1 | UE-8 | MCS LEVEL 1 | RB-2 | RB-3 | UE-5 | MCS LEVEL 2 | RB-4 | RB-5 | RB-6 | UE-6 | MCS LEVEL 3 | RB-7 | RB-8 | UE-7 | MCS LEVEL 2 |

FIG.5

| RB NUMBER | ALLOCATION-ID | ALLOCATION MCS |
|---|---|---|
| #1 | UE - 8 | MCS LEVEL 1 |
| #2 | UE - 5 | MCS LEVEL 2 |
| #3 | | |
| #4 | UE - 6 | MCS LEVEL 3 |
| #5 | | |
| #6 | | |
| #7 | UE - 7 | MCS LEVEL 2 |
| #8 | | |

FIG.6

RADIO TRANSMISSION DEVICE AND RADIO TRANSMISSION METHOD

TECHNICAL FIELD

The present invention relates to a radio transmitting apparatus and radio transmission method in an OFDM (Orthogonal Frequency Division Multiplexing) system.

BACKGROUND ART

In recent years, in radio communication, particularly in mobile communication, various kinds of information such as images and data other than speech have become targets of transmission. Demand for higher-speed transmission is likely to increase in the future, and, to realize high-speed transmission, a radio transmission technique is desired that realizes high transmission efficiency by utilizing limited frequency resources efficiently.

Radio transmission techniques that respond to this demand include OFDM. OFDM refers to a multicarrier transmission technique for transmitting data in parallel using a large number of subcarriers, and is known as a technique that has high frequency utilization efficiency and characteristics of reducing inter-symbol interference under a multipath environment and that is effective in improving transmission efficiency.

A technique is studied of performing frequency scheduling when this OFDM is used in downlink and data for a plurality of mobile stations is frequency-multiplexed on a plurality of subcarriers (for example, see Non-Patent Document 1).

With frequency scheduling, a base station allocates subcarriers to mobile stations adaptively based on received quality of each frequency band at the mobile stations, so that it is possible to obtain a maximal multi-user diversity effect and perform communication very efficiently.

Data for the mobile stations for which allocation is determined by frequency scheduling (for example, speech, data and image) is transmitted using a shared channel. Further, a technique is studied of reporting in a shared control channel (hereinafter "SCCH") per mobile station, transmission parameters (for example, allocation RB [Resource Block] number, allocated mobile station ID and MCS [Modulation and Coding Scheme]) for data transmitted using a shared channel (see Non-Patent Document 1).

Non-Patent Document 1: R1-050590, "Physical Channels and Multiplexing in Evolved UTRA Downlink", NTT DoCoMo, 3GPP TSG-RAN WG1, 2005/06

DISCLOSURE OF INVENTION

Problems to be Solved by the Invention

However, to transmit one SCCH to one mobile station, when there are a large number of mobile stations receiving low-rate data, a large number of SCCHs are transmitted according to the number of mobile stations. Therefore, the number of SCCHs increases, a data field in one TTI (Transmission Timing Interval), which is one unit of a transmission data block specified in 3GPP, decreases, and throughput thereby decreases.

It is therefore an object of the present invention to provide a radio transmitting apparatus and radio transmission method that accommodate a large number of mobile stations receiving low-rate data and prevent a decrease in system throughput.

Means for Solving the Problem

The radio transmitting apparatus of the present invention includes an allocating section that performs frequency scheduling for a mobile station apparatus and allocates a resource block comprising a control unit in frequency scheduling, to the mobile station apparatus; a grouping section that groups a plurality of mobile station apparatuses that satisfy a predetermined requirement as low rate user equipment that receives low rate data, and assigns a group identity to the grouped low rate user equipment; a shared control channel generating section that generates a shared control channel including the group identity; a control information generating section that generates control information showing allocation information of a resource block allocated to the low rate user equipment; a multiplexing section that multiplexes the shared control channel, data and the control information, and multiplexes the control information on a data field of the resource block to which the low rate data is allocated; and a transmitting section that transmits a multiplexed signal.

The radio transmission method of the present invention includes an allocating step of performing frequency scheduling for a mobile station apparatus and allocating a resource block comprising a control unit of frequency scheduling, to the mobile station apparatus; a grouping step of grouping a plurality of mobile station apparatuses that satisfy a predetermined requirement as low rate user equipment that receives low rate data, and assigning a group identity to the grouped low rate user equipment; and a multiplexing step of multiplexing a shared control channel including the group identity, control information showing allocation information of a resource block allocated to the low rate user equipment and data, and multiplexing the control information on a data field of the resource block to which the low rate data is allocated.

Advantageous Effect Of The Invention

According to the present invention, it is possible to accommodate a large number of mobile stations receiving low-rate data and prevent a decrease in system throughput.

BRIEF DESCRIPTION OF DRAWINGS

FIG. 2 shows a determination criterion for low-rate UE's in a group ID assigning section shown in FIG. 1;

FIG. 5 shows an SCCH format generated by an SCCH processing section shown in FIG. 1;

FIG. 6 shows allocation information in an SCCH;

BEST MODE FOR CARRYING OUT THE INVENTION

Embodiments of the present invention will be described in detail below with reference to the accompanying drawings.

Embodiment 1

Figure 1:
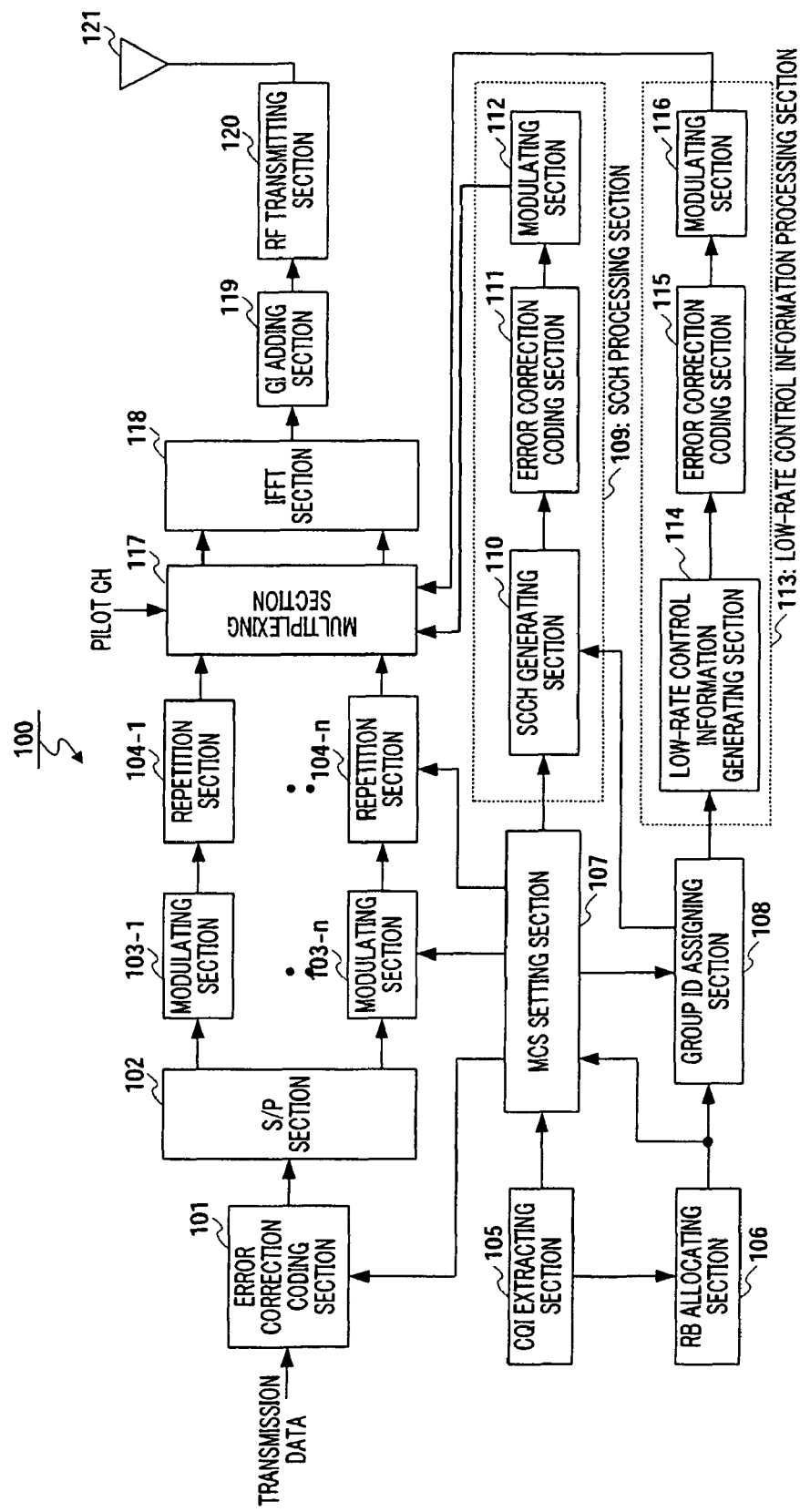
FIG. 1 is a block diagram showing the configuration of a transmitting apparatus according to Embodiments 1, 3 and 5 of the present invention.

FIG. 1 is a block diagram showing the configuration of transmitting apparatus 100 according to Embodiment 1 of the present invention. In this figure, error correction coding section 101 performs error correction coding on transmission data at a coding rate outputted from MCS setting section 107 described later, and outputs the result to S/P (serial/parallel) section 102.

S/P section 102 converts serial encoded data outputted from error correction coding section 101 into a plurality of sequences of parallel encoded data according to a data size that can be transmitted per RB, and outputs the sequences of encoded data to modulating sections 103-1 to 103-n, respectively.

Modulating sections 103-1 to 103-n modulate the encoded data outputted from S/P section 102 per RB according to the modulation scheme outputted from MCS setting section 107, generates data symbols, and outputs the generated data symbols to corresponding repetition sections 104-1 to 104-n. The same number of modulating sections 103-1 to 103-n as the number of RB's n included in one OFDM symbol, are provided.

Repetition sections 104-1 to 104-n perform symbol repetition on the data symbols outputted from modulating sections 103-1 to 103-n per RB according to the number of repetitions outputted from MCS setting section 107 and output the results to multiplexing section 117. The same number of repetition sections 104-1 to 104-n as the number of resource blocks n included in one OFDM symbol, are provided.

CQI extracting section 105 acquires feedback information transmitted from receiving apparatus 200 described later and extracts CQI information from the acquired feedback information. The extracted CQI information is outputted to RB allocating section 106 and MCS setting section 107.

RB allocating section 106 allocates mobile stations (hereinafter "UE") to RB's using an arbitrary scheduling method (for example, max CIR method, proportional fairness method), based on the CQI information outputted from CQI extracting section 105. RB allocating section 106 outputs the ID's of UE's allocated to RB's (allocated UE-ID's) and allocation RB numbers to MCS setting section 107 and group ID assigning section 108.

MCS setting section 107 determines per UE maximum MCS parameters (the coding rate of an error correction code, the modulation scheme and the number of repetitions) that make the received packet error rate less than 0.1, based on the allocated UE-ID's and allocation RB numbers outputted from RB allocating section 106, and the CQI information outputted from CQI extracting section 105. The determined coding rate is outputted to error correction coding section 101, the modulation scheme is outputted to modulating sections 103-1 to 103-n, and the number of repetitions is outputted to repetition sections 104-1 to 104-n. Further, the determined MCS parameters are outputted to group ID assigning section 108 and SCCH processing section 109.

Group ID assigning section 108 determines whether each UE receives low-rate data (hereinafter "low-rate UE") or receives high-rate data (hereinafter "high-rate UE") based on, for example, the determination criterion as shown in FIG. 2, using the allocated UE-ID's and allocation RB numbers outputted from RB allocating section 106, and the MCS parameters outputted from MCS setting section 107.

In the example of FIG. 2, when the modulation level shown in the MCS parameters is QPSK or lower and the amount of allocated resource is 1 RB or less, the UE is determined to be a low-rate UE, and is determined to be a high-rate UE otherwise. Group ID assigning section 108 groups a plurality of UE's determined as low-rate UE's and assigns a group ID to the grouped UE's. The allocated UE-ID's of the grouped UE's (hereinafter "low-rate UE-ID") are changed to the assigned group ID. For low-rate UE's, the assigned group ID, low-rate UE-ID's and allocation RB numbers are outputted, and, for high-rate UE's, the allocated UE-ID's and allocation RB numbers are outputted to SCCH processing section 109. Further, the low-rate UE-ID's and allocation RB numbers are outputted to low-rate control information processing section 113.

SCCH processing section 109 has SCCH generating section 110, error correction coding section 111 and modulating section 112. SCCH generating section 110 integrates the MCS parameters outputted from MCS setting section 107, low-rate UE-ID's and allocation RB numbers outputted from group ID assigning section 108, generates SCCH information, and outputs the generated SCCH information to error correction coding section 111. Error correction coding section 111 performs error correction coding on the SCCH information, and modulating section 112 modulates encoded data of the SCCH information and outputs the result to multiplexing section 117. The coding rate at error correction coding section 111 and the modulation scheme at modulating section 112 are determined in advance and not limited to specific coding rates and specific modulation schemes.

Low-rate control information processing section 113 has low-rate control information generating section 114, error correction coding section 115 and modulating section 116. Low-rate control information generating section 114 integrates the low-rate UE-ID's and allocation RB numbers outputted from group ID assigning section 108, generates low-rate control information and outputs the information to error correction coding section 115. Error correction coding section 115 performs error correction coding on the low-rate control information, and modulating section 116 modulates encoded data of the low-rate control information and outputs the result to multiplexing section 117. The coding rate at error correction coding section 115 and the modulation scheme at modulating section 116 are determined in advance.

Multiplexing section 117 multiplexes a pilot channel, SCCHs outputted from SCCH processing section 109, low-rate control channel outputted from low-rate control information processing section 113, and data symbols outputted from repetition sections 104-1 to 104-n, and outputs the multiplexed signal to IFFT section 118. The low-rate control channel is multiplexed on the heads of data channel fields of the RB's to which low-rate UE's are allocated.

IFFT section 118 converts the multiplexed signal outputted from multiplexing section 117 from a frequency domain signal to a time domain signal by performing IFFT (Inverse Fast Fourier Transform) processing, and generates an OFDM symbol which is a multicarrier signal. The generated OFDM symbol is outputted to GI adding section 119.

GI adding section 119 adds the same signal as the tail part of the OFDM symbol outputted from IFFT section 118 to the head of the OFDM symbol as a GI (Guard Interval) and outputs the result to RF transmitting section 120. By adding a GI, it is possible to reduce intersymbol interference due to a delay wave.

RF transmitting section 120 performs transmission processing such as D/A conversion, amplification and up-conversion on the OFDM symbol outputted from GI adding section 119, and transmits the signal subjected to transmission processing to receiving apparatus 200 via antenna 121.

Figure 3:
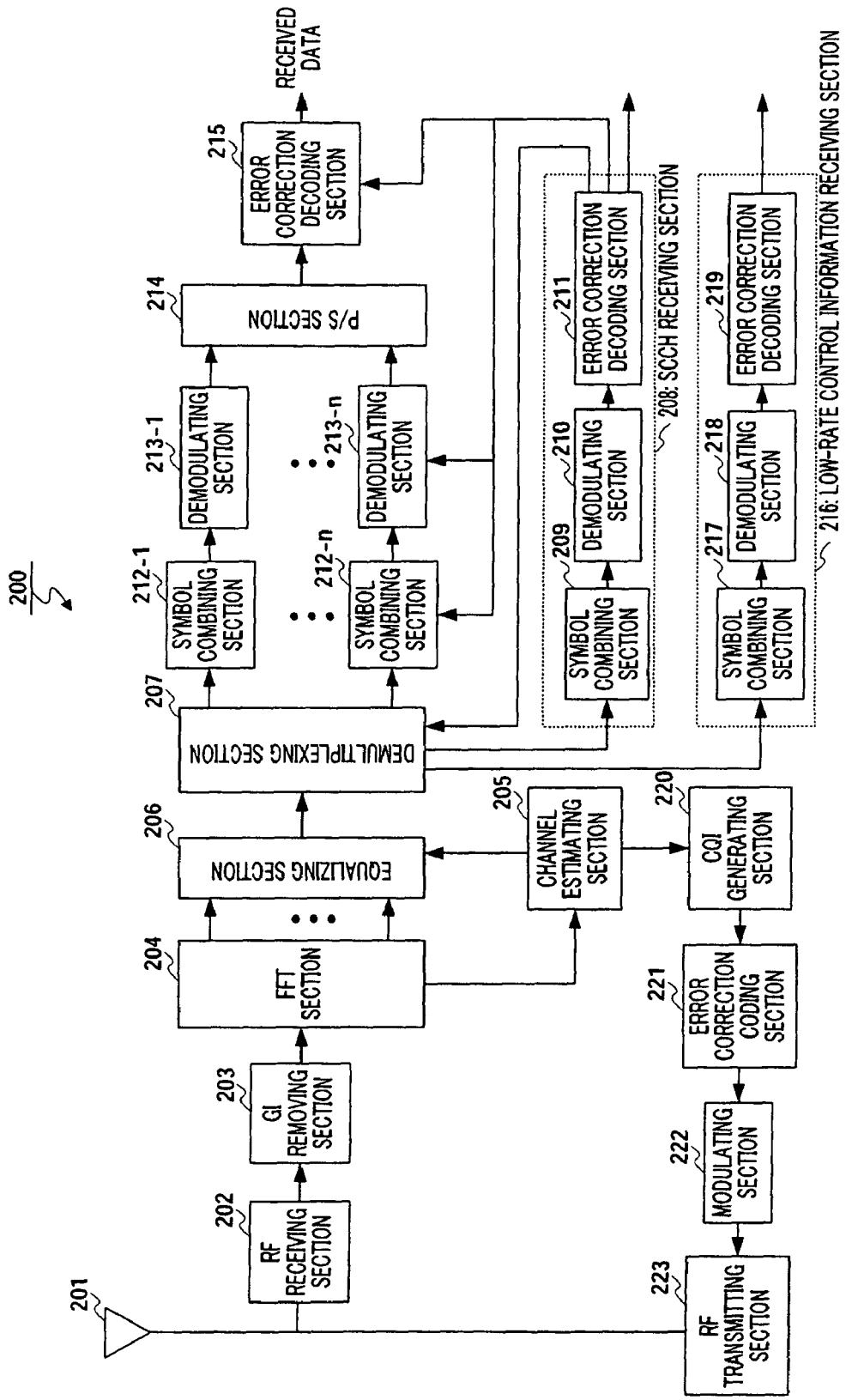
FIG. 3 is a block diagram showing the configuration of a receiving apparatus according to Embodiment 1 of the present invention.

FIG. 3 is a block diagram showing the configuration of receiving apparatus 200 according to Embodiment 1 of the present invention. In this figure, RF receiving section 202 receives the OFDM symbol transmitted from transmitting apparatus 100 shown in FIG. 1 via antenna 201, performs reception processing such as down-conversion and A/D conversion on the received OFDM symbol and outputs the result to GI removing section 203.

GI removing section 203 removes the GI added to the OFDM symbol and outputs the OFDM symbol to FFT section 204.

FFT section 204 performs FFT (Fast Fourier Transform) processing on the OFDM symbol outputted from GI removing section 203, converts the symbol from a time domain signal to a frequency domain signal, and obtains the pilot signal and other received signals. The pilot signal is outputted to channel estimating section 205, and other received signals are outputted to equalizing section 206.

Channel estimating section 205 performs channel estimation per subcarrier using the pilot signal for each subcarrier outputted from FFT section 204, and outputs a channel estimation value to equalizing section 206 and CQI generating section 220. Further, channel estimating section 205 detects the signal power value (S), interference power value (I) and noise power value (N) of the pilot signal for each subcarrier and outputs the SINR value to CQI generating section 220.

Equalizing section 206 performs equalizing processing on the received signal outputted from FFT section 204 using the channel estimation value outputted from channel estimating section 205.

Demultiplexing section 207 demultiplexes the received signal outputted from equalizing section 206 into the received data, the SCCHs and the low-rate control channel, outputs received data to symbol combining sections 212-1 to 212-n per RB, outputs the SCCHs to SCCH receiving section 208 and outputs the low-rate control channel to low-rate control information receiving section 216. The low-rate control channel is demultiplexed from the received data according to the allocation RB number of the low-rate allocation control channel inputted from SCCH receiving section 208.

SCCH receiving section 208 has symbol combining section 209, demodulating section 210 and error correction decoding section 211. Symbol combining section 209 performs symbol combining on the SCCHs outputted from demultiplexing section 207, demodulating section 210 demodulates the SCCHs subjected to symbol combining, and error correction decoding section 211 decodes the demodulated SCCHs and acquires allocation RB numbers, timing slots and MCS parameters for the allocation RB's. Here, if the mobile station is a low-rate UE, SCCH receiving section 208 outputs the allocation RB number of the low-rate control channel included in the SCCH to demultiplexing section 207. Demodulation processing and error correction decoding processing are performed according to predetermined MCS parameters and support the coding rate at error correction coding section 111 and the modulation scheme at modulating section 112 of transmitting apparatus 100 shown in FIG. 1, respectively.

Symbol combining sections 212-1 to 212-n perform symbol combining on symbols duplicated through repetition and a duplication source symbol out of received data outputted from demultiplexing section 207, according to an MCS parameter (the number of repetitions) outputted from SCCH receiving section 208, and output the results to corresponding demodulating sections 213-1 to 213-n. The same number of symbol combining sections 212-1 to 212-n as the number of resource blocks n included in one OFDM symbol, are provided.

Demodulating sections 213-1 to 213-n demodulate the combined symbols outputted from symbol combining sections 212-1 to 212-n according to an MCS parameter (modulation scheme) outputted from SCCH receiving section 208 and outputs the results to P/S section 214. The same number of demodulating sections 213-1 to 213-n as the number of resource blocks n included in one OFDM symbol, are provided.

P/S section 214 converts parallel data symbols outputted from demodulating sections 213-1 to 213-n into serial data symbols and outputs the results to error correction decoding section 215. Error correction decoding section 215 performs error correction decoding on the data symbols outputted from P/S section 214 according to MCS parameters (coding rates) outputted from SCCH receiving section 208. By this means, received data is obtained.

Low-rate control information receiving section 216 has symbol combining section 217, demodulating section 218 and error correction decoding section 219. Symbol combining section 217 performs symbol combining on the low-rate control information outputted from demultiplexing section 207, demodulating section 218 demodulates the low-rate control information subjected to symbol combining, and error correction decoding section 219 performs error correction decoding on the demodulated low-rate control information. By this means, the mobile station recognizes its allocation RB number.

CQI generating section 220 generates a CQI showing an SINR value of each RB outputted from channel estimating section 205. The generated CQI is encoded at error correction coding section 221, modulated at modulating section 222, subjected to transmission processing such as D/A conversion, amplification and up-conversion at RF transmitting section 223, and then transmitted to transmitting apparatus 100 shown in FIG. 1 from antenna 201.

Figure 4:
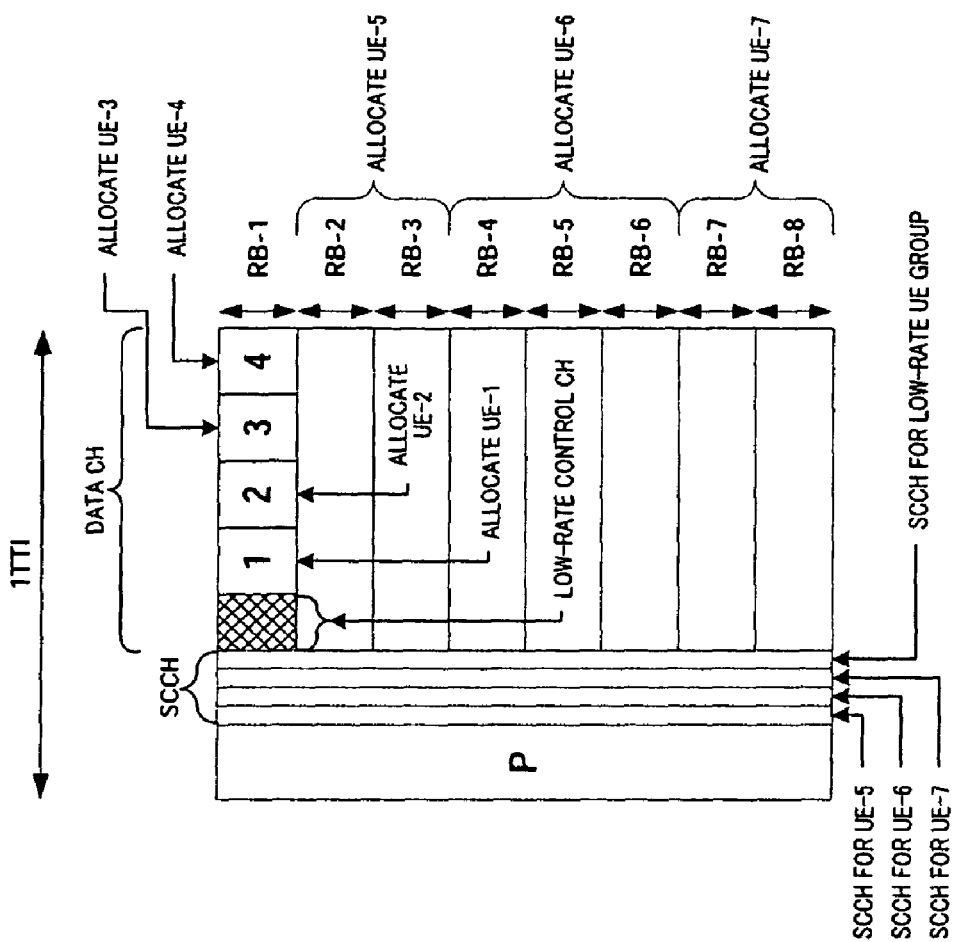
FIG. 4 shows arrangement of a signal in which physical channels are multiplexed.

FIG. 4 shows arrangement of a signal in which physical channels (pilot channel, SCCHs, shared data channel and low-rate control channel) are multiplexed. When the number of RB's is eight, the number of low-rate UE's is four (UE-1 to UE-4), the number of high-rate UE's is three (UE-5 to UE-7), the number of MCS levels is four, and RB allocating section 106 allocates low-rate UE's (UE-1 to UE-4) to RB-1 and allocates high-rate UE's (UE-5 to UE-7) to RB-2 to RB-8, a low-rate control channel is multiplexed on the head of a data channel field of RB-1 to which low-rate UE's are allocated as shown in FIG. 4. FIG. 5 shows an SCCH format generated by SCCH processing section 109 shown in FIG. 1, and FIG. 6 shows allocation information in an SCCH. Here, UE-8 shown in FIG. 5 and FIG. 6 is obtained by replacing low-rate UE-ID's (UE-1 to UE-4) for four UE's with a group ID for a low-rate group by group ID assigning section 108. That is, the allocated UE-ID of UE's receiving low-rate data allocated to RB's by RB allocating section 106 is reported as a group ID using an SCCH.

Figure 7:
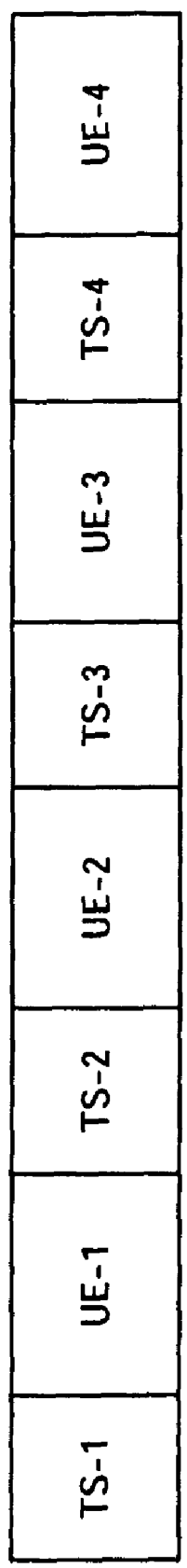
FIG. 7 shows a format of a low-rate control channel.

The low-rate UE-ID is reported through a low-rate control channel. FIG. 7 shows the format of a low-rate control channel for reference. TS's (Timing Slots) shown in FIG. 7 show an allocation resource field of RB-1 in FIG. 4, and show that UE-1 is allocated to TS-1 and UE-2 is allocated to TS-2. Further, FIG. 7 shows that UE-3 is allocated to TS-3 and UE-4 is allocated to TS-4.

Figure 8:
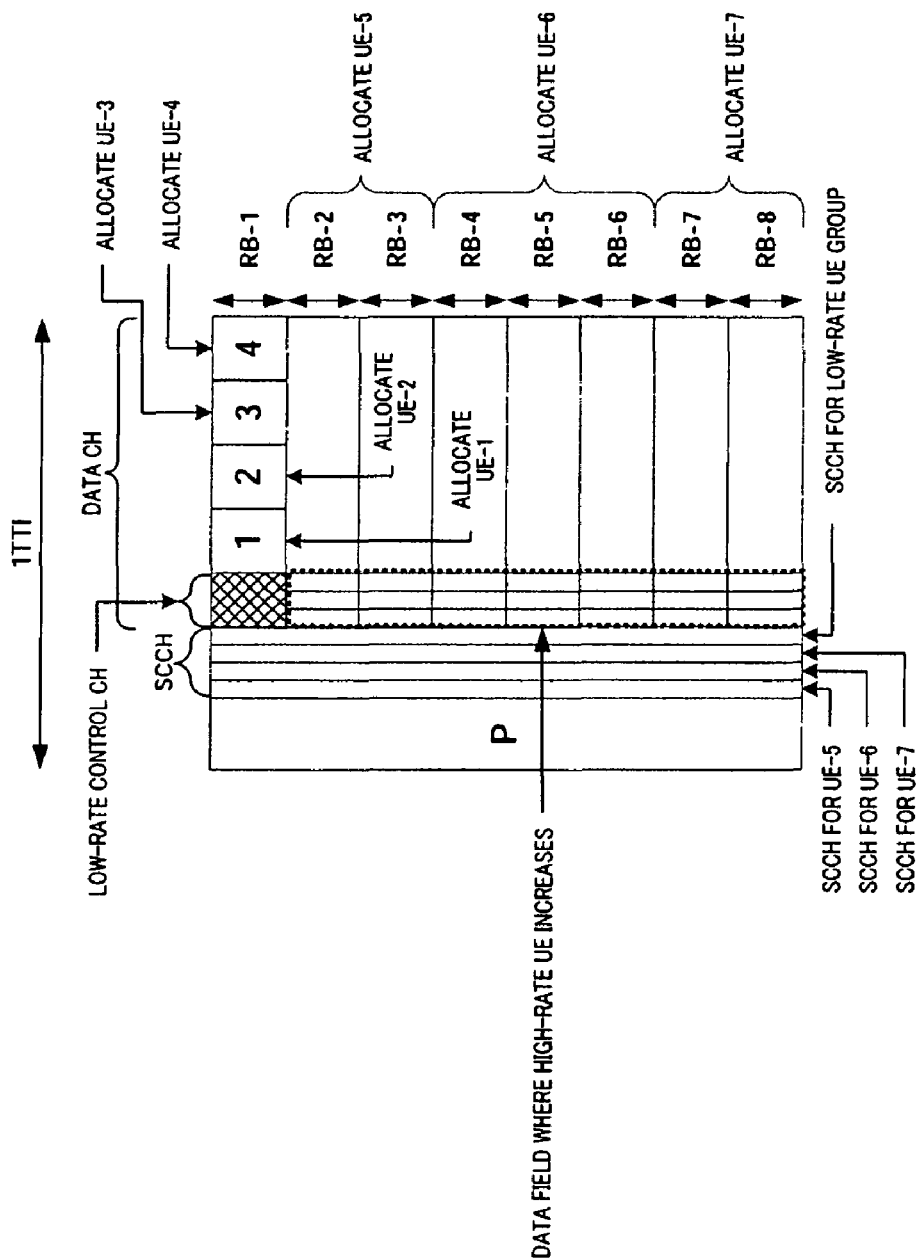
FIG. 8 shows a state where the field for storing SCCHs for low-rate UE's is eliminated from RB's to which high-rate reception UE's are allocated.

As shown in FIG. 4, by arranging a low-rate control channel to an RB to which low-rate UE's are allocated, it is possible to eliminate the field for storing SCCHs for low-rate UE's from RB's to which high-rate UE's are allocated. This is shown in FIG. 8. In FIG. 8, the field shown by a dotted box can be improved as a field for allocating high-rate UE's.

In this way, according to Embodiment 1, by grouping UE's receiving low-rate data, performing frequency allocation using a group ID, and arranging control information showing timing slots to which low-rate UE's are allocated, in RB's to which low-rate data is allocated, a data field of RB's for allocating high-rate data can be improved, so that it is possible to accommodate a large number of low-rate UE's and prevent a decrease in system throughput.

Figure 9:
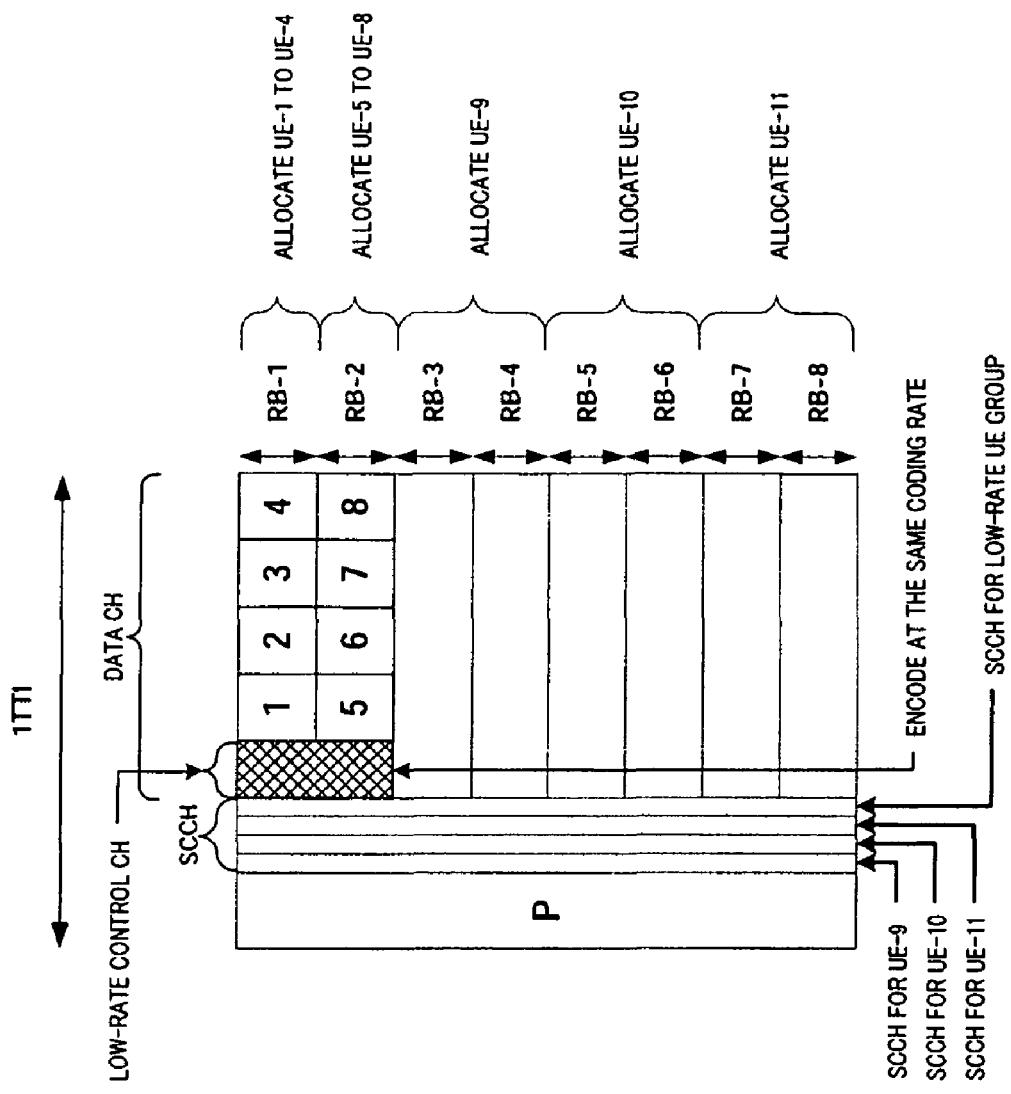
FIG. 9 shows a state where low-rate control channels are arranged in a plurality of RB's.

As shown in FIG. 9, when a low-rate control channel is arranged in a plurality of RB's, allocation TS numbers and UE-ID's are not encoded per RB, but may be encoded collectively using the same coding rate. By this means, it is possible to obtain a higher coding gain and improve the error rate of low-rate control information.

Further, when MCSs for low-rate UE's are controlled individually, relative values (difference information) of the MCSs reported using SCCHs, may be reported through low-rate control information. By this means, the receiving apparatus can perform reception processing using MCS parameters according to channel characteristics, so that it is possible to improve throughput of low-rate UE's.

Figure 10:
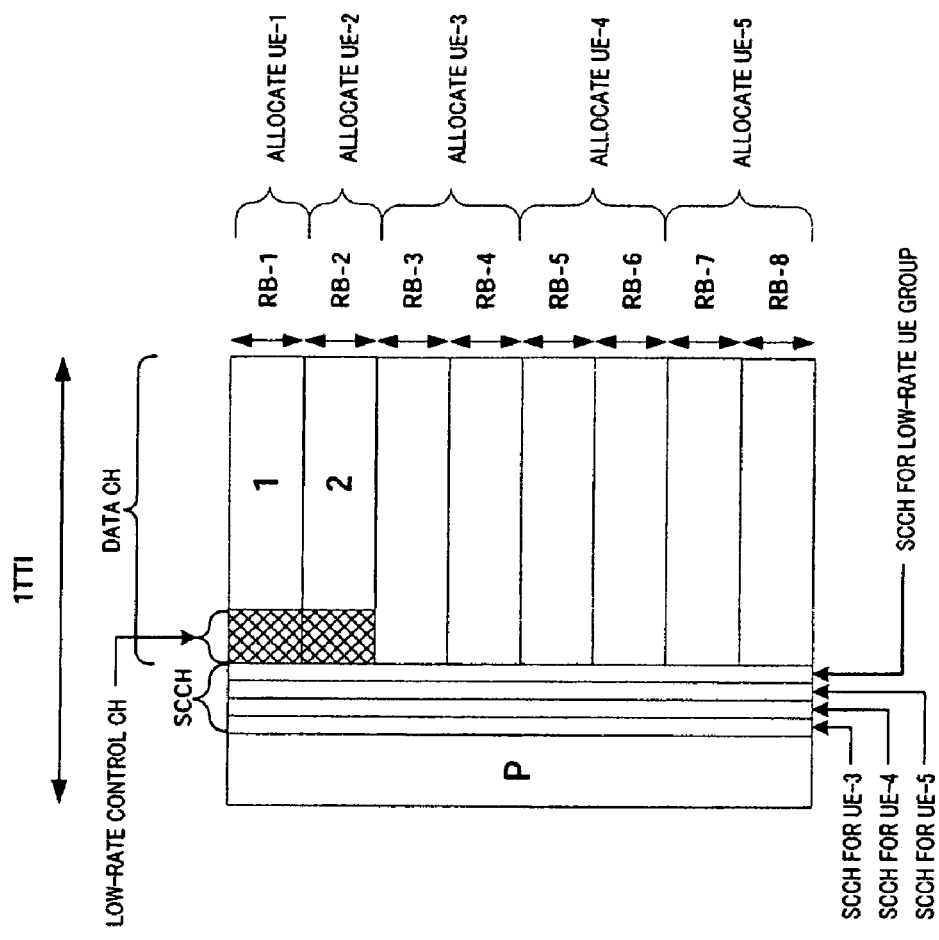
FIG. 10 shows a state where a plurality of low-rate UE's are each arranged in one RB.

Further, when a plurality of low-rate UE's are each arranged in one RB, as shown in FIG. 10, it is also possible to group low-rate UE's, report RB's to which the low-rate UE group is allocated, using SCCHs, and report the MCSs and the like for each low-rate UE using low-rate control information.

Embodiment 2

Figure 11:
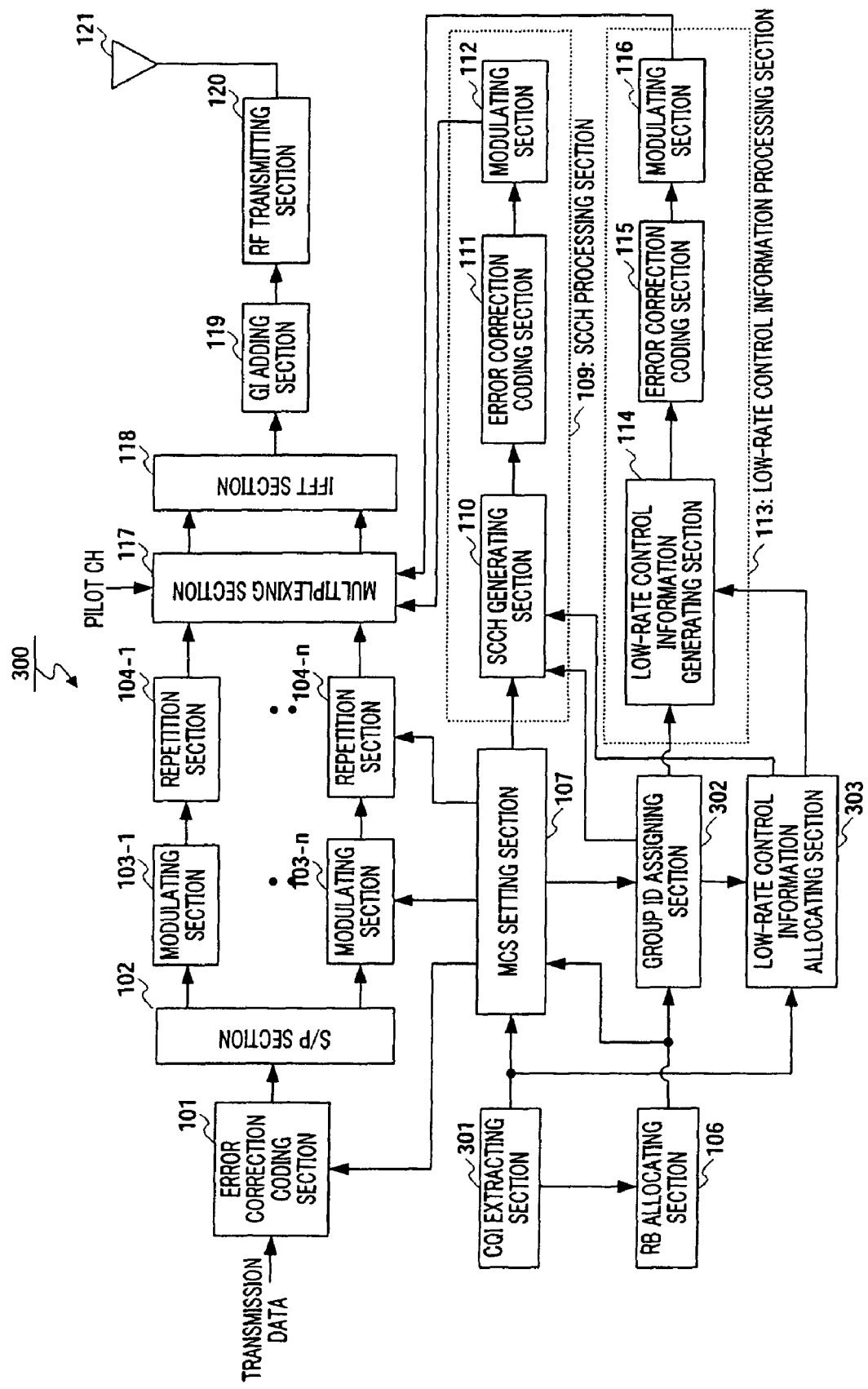
FIG. 11 is a block diagram showing the configuration of a transmitting apparatus according to Embodiment 2 of the present invention.

FIG. 11 is a block diagram showing the configuration of transmitting apparatus 300 according to Embodiment 2 of the present invention. In this figure, CQI extracting section 301 acquires feedback information transmitted from the receiving apparatus, extracts CQI information from the acquired feedback information, and outputs the extracted CQI information to RB allocating section 106, MCS setting section 107 and low-rate control information allocating section 303. This CQI information reports reception characteristics of each RB estimated at each UE using the SINR or MCS.

Group ID assigning section 302 determines whether each UE receives low-rate data or high-rate data, using the allocated UE-ID's and allocation RB numbers outputted from RB allocating section 106 and the MCS parameters outputted from MCS setting section 107. Group ID assigning section 302 groups a plurality of UE's determined as low-rate UE's, and assigns a group ID to the grouped UE's. For low-rate UE's, the assigned group ID, the low-rate UE-ID's and allocation RB numbers are outputted, and, for high-rate UE's, the allocated UE-ID's and allocation RB numbers are outputted to SCCH processing section 109. Further, the low-rate UE-ID's and allocation RB numbers are outputted to low-rate control information processing section 113 and low-rate control information allocating section 303.

Low-rate control information allocating section 303 acquires reception characteristics of each RB outputted from group ID assigning section 302 from the CQI information outputted from CQI extracting section 301, determines the RB which is reported as having good reception characteristics by the largest number of CQI information among the CQI information transmitted from the low-rate UE's, as the RB having the best reception characteristics, and allocates low-rate control information to this RB collectively. The allocation information (allocation RB number) of low-rate control information is outputted to SCCH processing section 109. By changing the RB for allocating low-rate control information, if the allocation RB number for the low-rate UE changes, a low-rate UE-ID is outputted with the changed allocation RB number to low-rate control information processing section 113.

Figure 12:
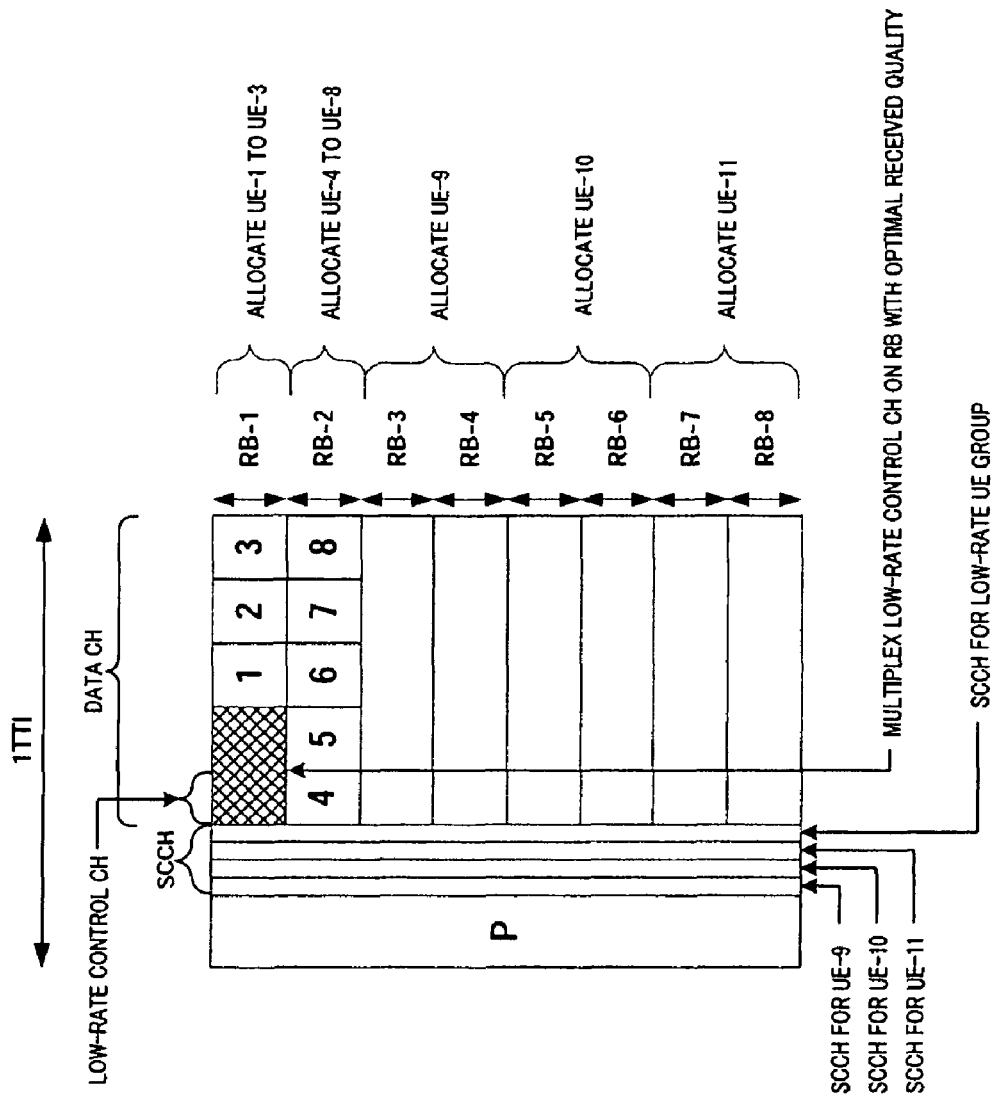
FIG. 12 shows arrangement of a signal in which physical channels are multiplexed.

FIG. 12 shows arrangement of a signal in which physical channels (pilot channel, SCCHs, shared data channel and low-rate control channel) are multiplexed. Here, the number of RB's is eight, the number of low-rate UE's is eight (UE-1 to UE-8), the number of high-rate UE's is three (UE-9 to UE-11), and the number of MCS levels is four. Further, allocation RB numbers, allocated UE-ID's and MCSs are reported using SCCHs.

FIG. 12 shows a case of allocating low-rate control information collectively to RB-1 with the best reception characteristics, allocating low-rate UE's (UE-1 to UE-8) to RB-1 and RB-2, which is adjacent to RB-1, and further allocating high-rate UE's (UE-9 to UE-11) to RB-3 to RB-8. Particularly, low-rate control channels are multiplexed collectively at the head of a data channel field of RB-1 with the best reception characteristics. In RB-1 and RB-2 in FIG. 12, allocation is performed such that the UE-ID and the timing number become the same, but the present invention is not limited to this allocation.

In this way, according to Embodiment 2, by arranging low-rate control information collectively to the RB with the best received quality, it is possible to improve the error rate of low-rate control information.

Although a case has been described with this embodiment where the number of RB's to which the low-rate UE with the best received quality is allocated is one, if there are a plurality of such RB's, low-rate control information may be divided and arranged in these plurality of RB's.

Embodiment 3

The configuration of the transmitting apparatus according to Embodiment 3 of the present invention is the same as the configuration of transmitting apparatus 100 according to Embodiment 1 except the part of functions, and so will be described using FIG. 1.

Based on the MCS parameters outputted from MCS setting section 107, group ID assigning section 108 groups low-rate UE's on condition that all low-rate UE's allocated to the same RB have the same MCS, and assigns a group ID to the grouped UE's.

Figure 13:
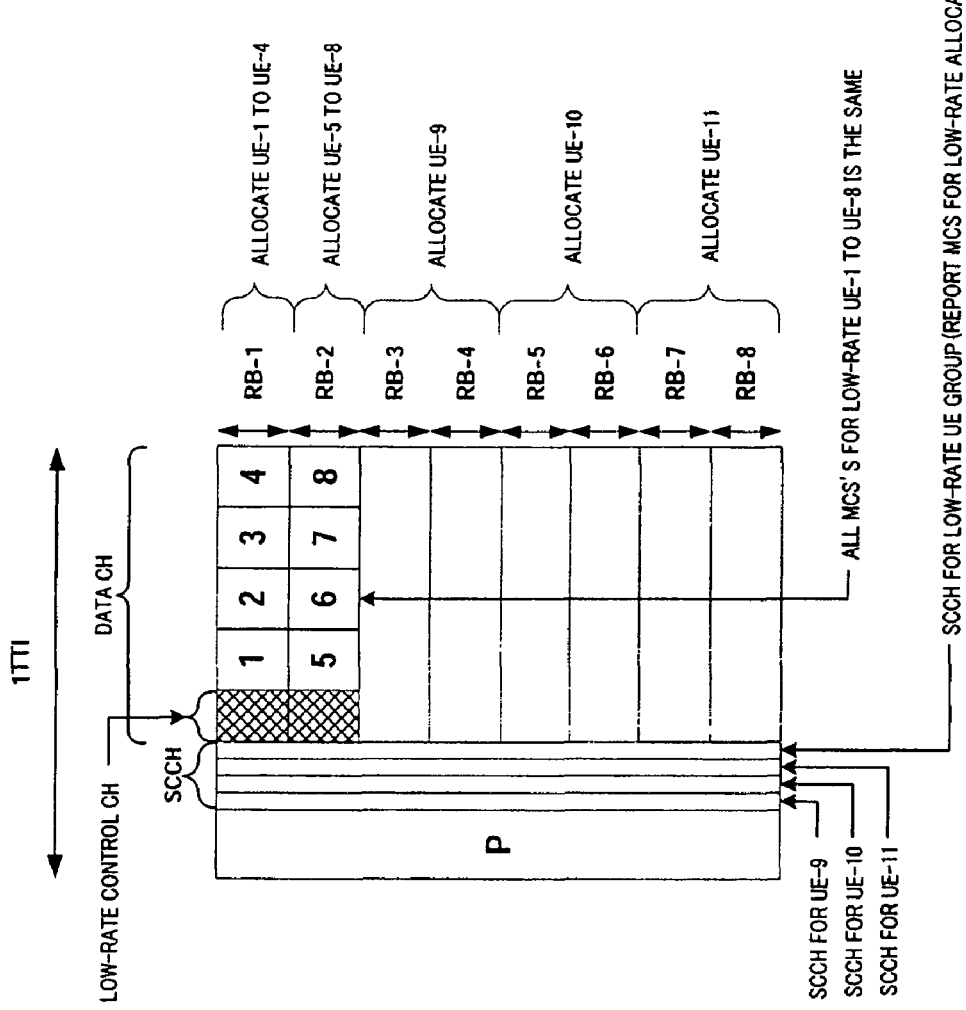
FIG. 13 shows arrangement of a signal in which physical channels are multiplexed.

FIG. 13 shows arrangement of a signal in which physical channels (pilot channel, SCCHs, shared data channel and low-rate control channel) are multiplexed. Here, the number of RB's is eight, the number of low-rate UE's is eight (UE-1 to UE-8), the number of high-rate UE's is three (UE-9 to UE-11) and the number of MCS levels is four. Further, allocation RB numbers, allocated UE-ID's and MCSs are reported using SCCHs.

In FIG. 13, low-rate UE-1 to UE-8 having the same MCS are grouped, and this MCS is reported using an SCCH, so that it is possible to reduce an MCS for each low-rate UE from low-rate control information. In RB-1 and RB-2 in FIG. 13, allocation is performed such that the UE-ID and the timing number become the same, but the present invention is not limited to this allocation.

In this way, according to Embodiment 3, by grouping low-rate UE's for which the same MCS is set and reporting this MCS using an SCCH, it is not necessary to include the MCS for each low-rate UE in low-rate control information, so that it is possible to reduce the amount of low-rate control information.

Embodiment 4

In Embodiment 4 of the present invention, the receiving apparatus reports the moving speed of the receiving apparatus together with the received signal level as a CQI to the transmitting apparatus.

Figure 14:
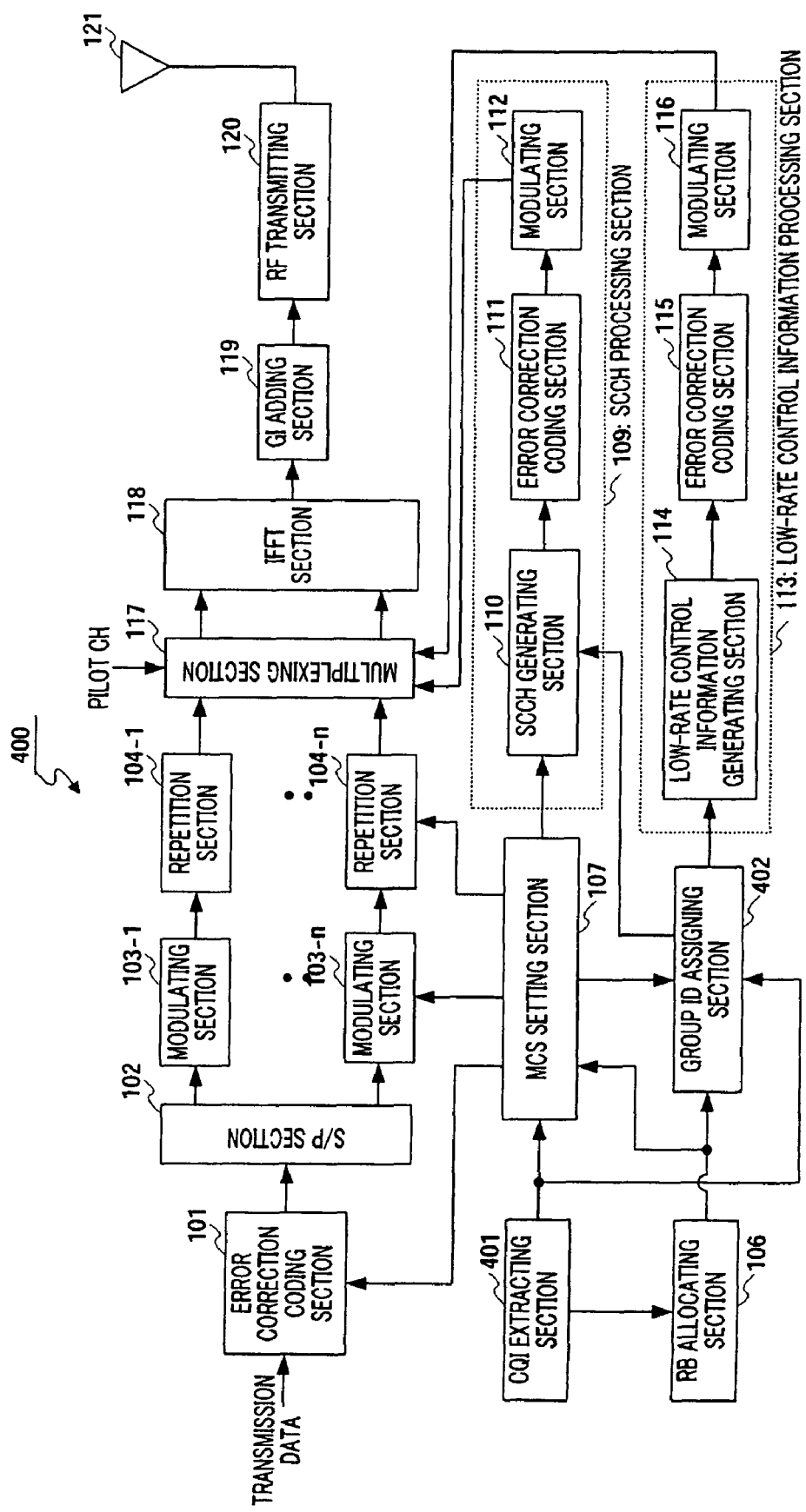
FIG. 14 is a block diagram showing the configuration of a transmitting apparatus according to Embodiment 4 of the present invention.

FIG. 14 is a block diagram showing the configuration of transmitting apparatus 400 according to Embodiment 4 of the present invention. In this figure, CQI extracting section 401 acquires information showing the moving speed of the receiving apparatus included in feedback information from the receiving apparatus and extracts CQI information and moving speed information from the feedback information. CQI extracting section 401 outputs the extracted CQI information to RB allocating section 106 and MCS setting section 107, and outputs the moving speed information to group ID assigning section 402.

Based on the moving speed information outputted from CQI extracting section 401, and, if the moving speed of all low-rate UE's allocated to the same RB falls within a certain range, group ID assigning section 402 groups these low-rate UE's and assigns a group ID to the grouped UE's.

By this means, for example, by grouping low-rate UE's with high moving speed and adding a dedicated pilot to the data channel of the RB to which these low-rate UE's are allocated, it is possible to improve channel estimation accuracy which deteriorates when the moving speed is high.

Embodiment 5

The configuration of the transmitting apparatus according to Embodiment 5 of the present invention is the same as the configuration of transmitting apparatus 100 according to Embodiment 1 except the part of functions, and so will be described using FIG. 1.

SCCH processing section 109 generates an SCCH including an allocation rule for low-rate UE's in each TTI included in a frame, in a TTI at the head of this frame. The allocation rule for low-rate UE's includes, for example, in each TTI, specifying low-rate UE's to be allocated in ascending order of the RB number out of RB's other than the RB's to which high-rate UE's are allocated.

Figure 15:
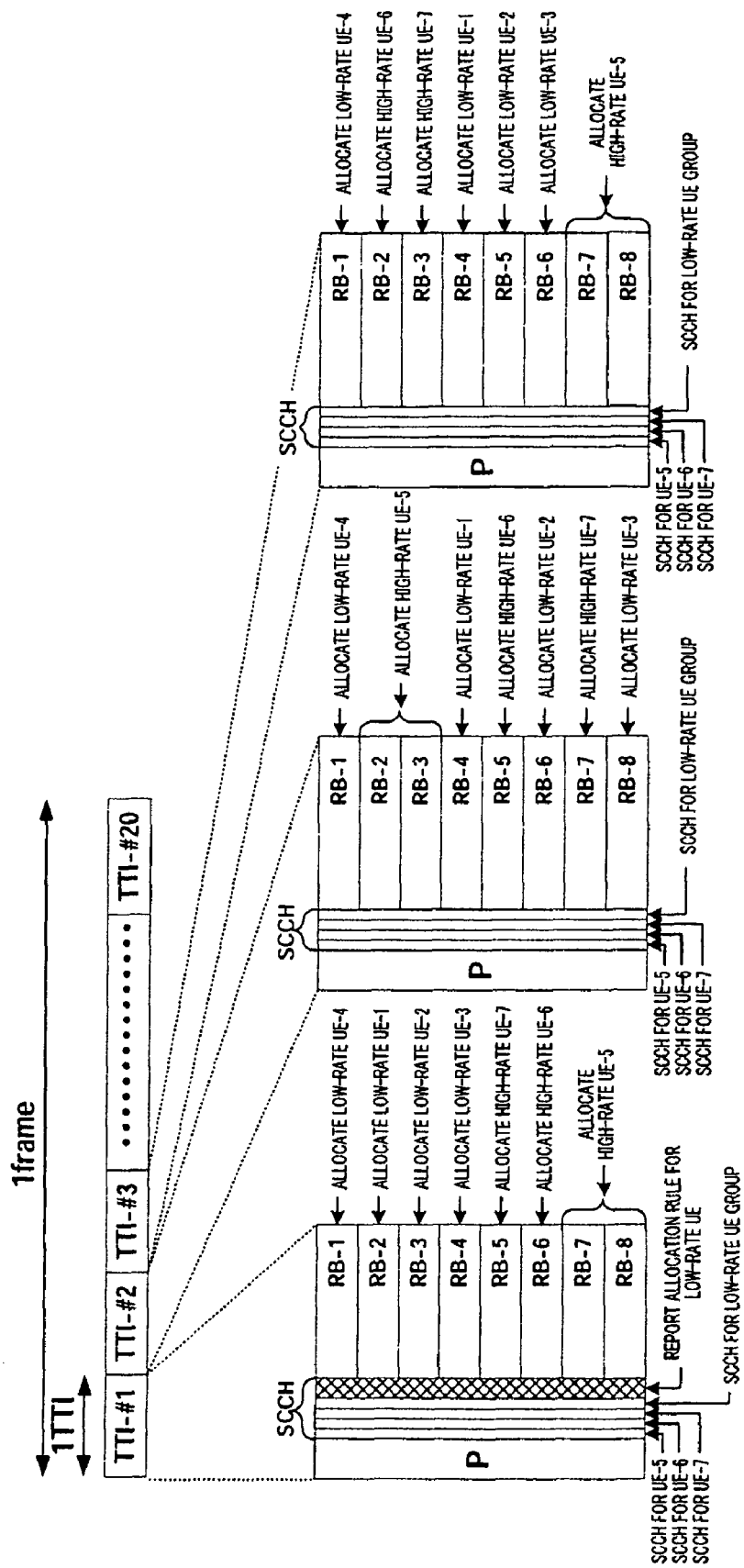
FIG. 15 shows arrangement of a signal in which physical channels are multiplexed.

FIG. 15 shows arrangement of a signal in which physical channels (pilot channel, SCCHs, shared data channel and low-rate control channel) are multiplexed. Here, the number of RB's is eight, the number of low-rate UE's is four (UE-1 to UE-4), the number of high-rate UE's is three (UE-5 to UE-7) and the number of MCS levels is four. Further, allocation RB numbers, allocated UE-ID's and MCSs are reported using SCCHs.

FIG. 15 shows a state where, in TTI-#1, which is the head of a frame, an SCCH including the allocation rule for low-rate UE's is multiplexed. Here, the allocation rule specifies to allocate low-rate UE-4, UE-1, UE-2 and UE-3 in ascending order of the RB number, out of RB's other than the RB to which high-rate UE's are allocated.

According to this allocation rule, RB-2, RB-3, RB-5 and RB-7 are allocated to high-rate UE's in TTI-#2, and so the remaining RB-1 is allocated to low-rate UE-4, RB-4 is allocated to low-rate UE-1, RB-6 is allocated to low-rate UE-2, and, further, RB-8 is allocated to low-rate UE-3.

In the same way, RB-2, RB-3, RB-7 and RB-8 are allocated to high-rate UE's in TTI-#3, and so the remaining RB-1 is allocated to low-rate UE-4, RB-4 is allocated to low-rate UE-1, RB-5 is allocated to low-rate UE-2, and, further, RB-6 is allocated to low-rate UE-3.

In this way, according to Embodiment 5, by multiplexing an SCCH including the allocation rule for low-rate UE's in the frame on the TTI at the head of the frame, low-rate control information can be reduced in other TTI's in the same frame, and low-rate data can be thereby increased correspondingly, so that it is possible to improve throughput.

Although a case has been described with this embodiment where low-rate UE's are targets for grouping, even if low-rate UE's are replaced with UE's to which a distributed channel is allocated, the same effect can be obtained.

Although a case has been described as an example with the above-described embodiments where the present invention is implemented by hardware, but the present invention can also be implemented by software.

Each function block used to explain the above-described embodiments may be typically implemented as an LSI constituted by an integrated circuit. These may be individual chips or may partially or totally contained on a single chip. Here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application of biotechnology is also possible.

The present application is based on Japanese Patent Application No. 2005-326730, filed on Nov. 10, 2005, the entire content of which is expressly incorporated by reference herein.

INDUSTRIAL APPLICABILITY

The radio transmitting apparatus and radio transmission method according to the present invention can accommodate a large number of mobile stations that receive low-rate data, can prevent a decrease in system throughput, and are applicable to radio communication base station apparatuses and the like.

The invention claimed is:

1. A radio transmitting apparatus comprising:
   an allocating section that performs frequency scheduling for a mobile station apparatus and allocates a resource block comprising a control unit in frequency scheduling, to the mobile station apparatus;
   a grouping section that groups a plurality of mobile station apparatuses that satisfy a predetermined requirement as low rate user equipment that receives low rate data, and assigns a group identity to the grouped low rate user equipment;

a shared control channel generating section that generates a shared control channel including the group identity;

a control information generating section that generates control information showing allocation information of a resource block allocated to the low rate user equipment;

a multiplexing section that multiplexes the shared control channel, data and the control information, and multiplexes the control information on a data field of the resource block to which the low rate data is allocated; and a transmitting section that transmits a multiplexed signal.

2. The radio transmitting apparatus according to claim 1, further comprising a control information coding section that encodes the control information arranged over a plurality of resource blocks, at the same coding rate.

3. The radio transmitting apparatus according to claim 1, wherein, when one resource block is allocated to a plurality of low rate user equipment, the shared control channel reports that the resource block is allocated to the plurality of low rate user equipment, and the control information reports allocation information in the resource block.

4. The radio transmitting apparatus according to claim 1, further comprising a modulation and coding scheme setting section that sets a modulation and coding scheme for the mobile station apparatus, wherein the shared control channel specifies an average modulation and coding scheme for the low rate user equipment, and the control information specifies a relative value between each modulation and coding scheme for the low rate user equipment and the average modulation and coding scheme.

5. The radio transmitting apparatus according to claim 1, further comprising a control information allocating section that allocates control information collectively to only a resource block with a best reception characteristic, wherein the multiplexing section multiplexes low rate data on a resource block adjacent to the resource block with the best reception characteristic.

6. A radio transmitting apparatus according to claim 1, further comprising a modulation and coding scheme setting section that sets a modulation and coding scheme for the mobile station apparatus, wherein the grouping section groups low rate user equipment for which the same modulation and coding scheme is set.

7. The radio transmitting apparatus according to claim 1, further comprising a receiving section that receives moving speed information of the mobile station apparatus, wherein the grouping section groups low rate user equipment with a moving speed within a certain range, based on the moving speed information.

8. A radio transmission method comprising:

an allocating step of performing frequency scheduling for a mobile station apparatus and allocating a resource block comprising a control unit of frequency scheduling, to the mobile station apparatus;

a grouping step of grouping a plurality of mobile station apparatuses that satisfy a predetermined requirement as low rate user equipment that receives low rate data, and assigning a group identity to the grouped low rate user equipment; and a multiplexing step of multiplexing a shared control channel including the group identity, control information showing allocation information of a resource block allocated to the low rate user equipment and data, and multiplexing the control information on a data field of the resource block to which the low rate data is allocated.

* * * * *